United States Patent [19]

Kämpeen et al.

[11] 4,217,226

[45] Aug. 12, 1980

[54] PUSHER CENTRIFUGE

[75] Inventors: Yves Kämpeen, Oberglatt; Bernd Hoppe, Weiningen; Ernst Rebsamen, Thalwil, all of Switzerland

[73] Assignee: Escher Wyss Limited, Zurich, Switzerland

[21] Appl. No.: 956,421

[22] Filed: Oct. 31, 1978

[30] Foreign Application Priority Data

Nov. 25, 1977 [CH] Switzerland ........................ 14407/77

[51] Int. Cl.[2] ........................ B01D 33/10; B01D 35/16

[52] U.S. Cl. ........................ 210/376

[58] Field of Search ........................ 210/369, 376

[56] References Cited

U.S. PATENT DOCUMENTS

| | | | |
|---|---|---|---|
| 2,991,887 | 7/1961 | Wirth | 210/376 |
| 3,322,336 | 5/1967 | Lohse et al. | 210/376 |
| 3,409,137 | 11/1968 | Schneider et al. | 210/213 |

FOREIGN PATENT DOCUMENTS

| | | | |
|---|---|---|---|
| 699927 | 11/1940 | Fed. Rep. of Germany | 210/376 |
| 368677 | 12/1939 | Italy | 210/376 |
| 65152 | 8/1942 | Norway | 210/376 |

*Primary Examiner*—Frank Sever

*Attorney, Agent, or Firm*—Robert A. Ostmann

[57] ABSTRACT

Pusher centrifuge having a pusher plate and a guiding wall for the mixture to be fed onto the centrifuge drum, with a free flow space between the pusher plate and the guiding wall; the improvement that the surfaces of the pusher plate and guiding wall facing the mixture to be fed extend at least substantially perpendicular to the axis of the centrifuge drum or extend away from the axis of the drum in the radial area which extends from the outer surface of the inlet pipe to the inner surface of the layer of mixture lying on the drum.

8 Claims, 3 Drawing Figures

PUSHER CENTRIFUGE

BACKGROUND OF THE INVENTION

The invention relates to a pusher centrifuge having a centrifuge drum, a pusher plate, an inlet pipe opening out coaxially with the centrifuge drum and a guiding wall for the centrifuging mexture to be fed onto the centrifuge drum, the said guiding wall extending from the inlet pipe to the inner surface of the layer of centrifuging mixture lying on the centrifuge drum, whilst a flow space, substantially free from components, for the centrifuging mixture is left between the pusher plate and the guiding wall.

The centrifuging mixture is passed into the centrifuge drum by means of the inlet pipe, which is usually non-rotating, and is guided by the guiding wall from the inlet pipe to the inner surface of the rotating centrifuge drum on which it forms the layer of centrifuging mixture from which the liquid is removed by centrifuging.

In known pusher centrifuges the guiding wall is connected to the pusher plate by means of fixing struts which pass through the flow space, which is substantially free from components. Accordingly, the guiding wall rotates with the centrifuge drum and the surface of the guiding wall is in the form of a truncated cone surface. The guiding wall has the task of gradually speeding up the centrifuging mixture emerging from the inlet pipe to the circumferential speed of the centrifuge drum and distributing this mixture as uniformly as possible over the circumference of the centrifuge drum. At the same time, damage to the solids should be prevented and the centrifuge drum should operate quietly.

SUMMARY OF THE INVENTION

The invention is based on the problem of providing a pusher centrifuge which treats the solids even more gently and at the same time operates quietly.

According to the invention, this problem is solved, with the pusher centrifuge described at the beginning by the fact that the surfaces of the pusher plate and guiding wall facing the centrifuging mixture to be fed on extend at least substantially perpendicular to the axis of the centrifuge drum or extend away from the axis of the said drum in the radial area which extends from the outer surface of the inlet pipe to the inner surface of the layer of centrifuging mixture lying on the centrifuge drum.

In this way, the centrifuging mixture to be fed onto the centrifuge drum is no longer passed over any walls, as is the case in known pusher centrifuges, but according to the invention this mixture to be fed onto the centrifuge drum passes into a space which is bounded on both sides by walls not facing the axis of the centrifuge drum; the centrifuging mixture no longer bears on these walls but is merely prevented by them from spreading out axially. Thus, the solids and liquid cannot separate en route from the inlet pipe to the inner surface of the centrifuge drum, and it is avoided that solid particles become detached from the mixture and bear on the walls. Thus, solid materials susceptible to particle break-up can also be centrifuged gently.

The guiding wall is advantageously attached to the pusher plate, as is known in the case of guiding walls which face the axis, and a separating gap is left between the guiding wall and the inlet pipe. However, it may also be advantageous to fix the guiding wall to the inlet pipe.

When the guiding wall is fixed to the pusher plate, it is advantageous to provide a sealing device in the region of the separating gap left between the guiding wall and the inlet pipe.

This sealing device advantageously comprises an annular disc extending parallel to and at a small spacing from the guiding wall.

Advantageously, this annular disc may either extend up to the inlet pipe, leaving a separating gap, and be fixed to the guiding wall, or it may be fixed to the inlet pipe.

BRIEF DESCRIPTION OF THE DRAWING

The invention is explained in more detail with reference to the drawings, which show simplified representations of embodiments by way of example. In the drawings.

DESCRIPTION OF THE PREFERRED EMBODIMENTS

Figure 1:
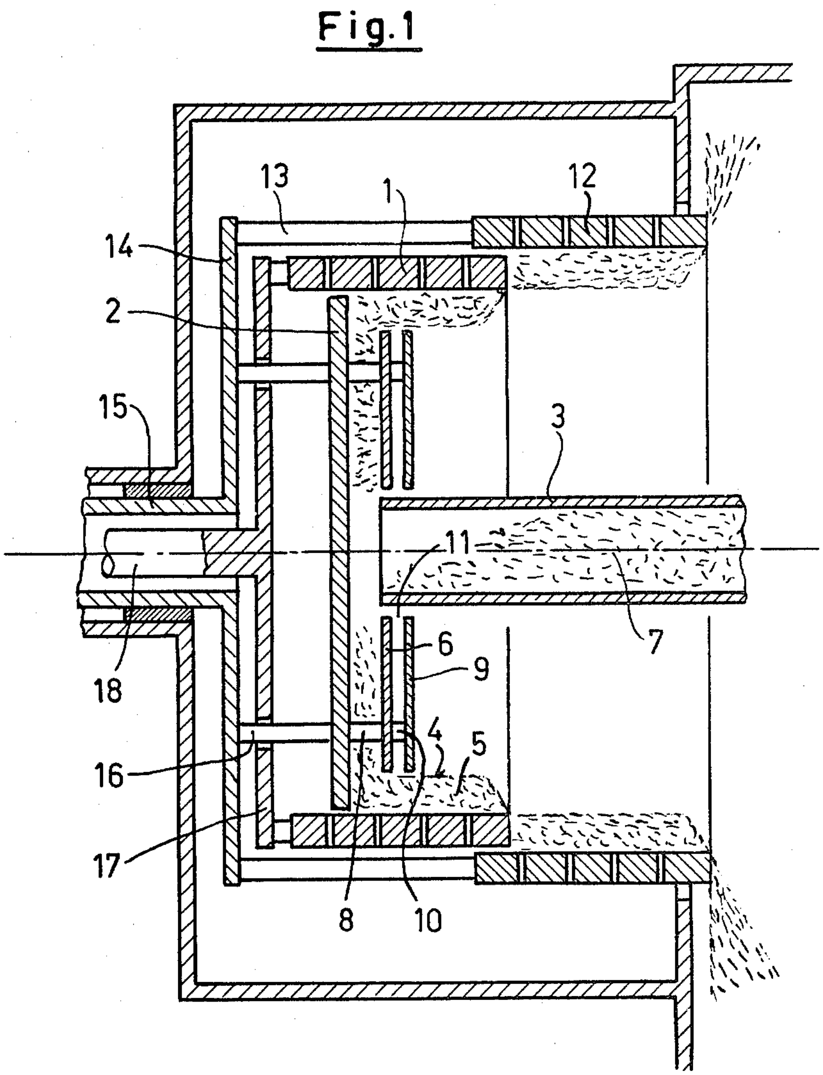
FIGS. 1 to 3 each show a vertical axial section through three different pusher centrifuges.

The pusher centrifuge shown in FIG. 1 comprises a centrifuge drum 1 with a pusher plate 2. An inlet pipe 3 opens into the centrifuge drum 1 coaxially with the said drum 1. A guiding wall 6 for the centrifuging mixture to be fed onto the centrifuge drum 1 extends from the inlet pipe 3 to the inner surface 4 of the layer of centrifuging mixture 5 lying on the centrifuge drum 1.

The centrifuging mixture to be fed into the drum is passed into the pusher centrifuge through the inlet pipe 3 and flows through the space between the pusher plate 2 and the guiding wall 6 on to the centrifuge drum 1 which is provided with sieve openings.

The surface of the pusher plate 2 and the surface of the guiding wall 6 which face the centrifuging mixture to be fed in each extend perpendicularly to the axis 7 of the centrifuge drum 1 in the radial area which extends from the outer surface of the inlet pipe 3 to the inner surface 4 of the layer of centrifuging mixture 5 lying on the centrifuge drum.

The guiding wall 6 is fixed to the pusher plate 2 by means of struts 8 and a separating gap is left between the wall 6 and the inlet pipe 3. The guiding wall 6, the pusher plate 2 and the centrifuge drum 1 rotate together whilst the inlet pipe 3 is stationary.

A sealing device 11 is arranged in the region of the separating gap left between the guiding wall 6 and the inlet pipe 3. This sealing device comprises an annular disc 9 extending parallel to and at a small spacing from the wall 6; this disc 9 extends up to the inlet pipe 3 leaving a separating gap, and is fixed to the guiding wall 6 by means of struts 10. The annular disc 9 also extends nearly to the inner surface 4 of the layer of centrifuging mixture 5 lying on the centrifuge drum 1.

During operation of the pusher centrifuge, the centrifuging mixture fed in through the inlet pipe 3 reached the centrifuging mixture located in the space defined by the guiding wall 6 and the pusher plate 2. Owing to the fact that the surfaces of this space which face the centrifuging mixture are not facing the axis of the centrifuge drum, the mixing ratio of solids to liquid remains constant over the width of the space, and the speeding up of the centrifuging mixture to the circumferential speed of the centrifuge drum 1 is achieved mainly by the mutual contact between parts of the centrifuging mixture. The friction between the centrifuging mixture and the walls of the space is reduced to a minimum. All the solid particles are surrounded by liquid, whith the result that direct friction between the solid particles and the walls is prevented.

The sealing device 11 comprising the annular disc 9 separates the solids chamber of the pusher centrifuge from the inlet chamber for the centrifuging mixture to be fed in. The two rotating walls, i.e. the guiding wall 6 and the annular disc 9, form a friction pump which sucks out those parts of the centrifuging mixture which pass through the separating gap between the inlet pipe 3 and the wall 6, and conveys them to the vicinity of the feed point of the centrifuge drum 1.

Adjoining the centrifuge drum 1 is a second centrifuge drum 12 which is fixed by means of struts 13 to an axle disc 14 on a hollow spindle 15. The pusher plate 2 is also fixed to the axle disc 14 by means of struts 16. The centrifuge drum 1 is fixed to the shaft 18 via an axle disc 17.

The shaft 18 is moved abck and forth by means of a push motor (not shown). Thus, the centrifuge drum 1 moves axially back and forth, whilst the centrifuge drum 12 and the pusher plate 2 together with the guiding wall 6 and the annular disc 9 are immovable in the axial direction of the centrifuge drum.

Figure 2:
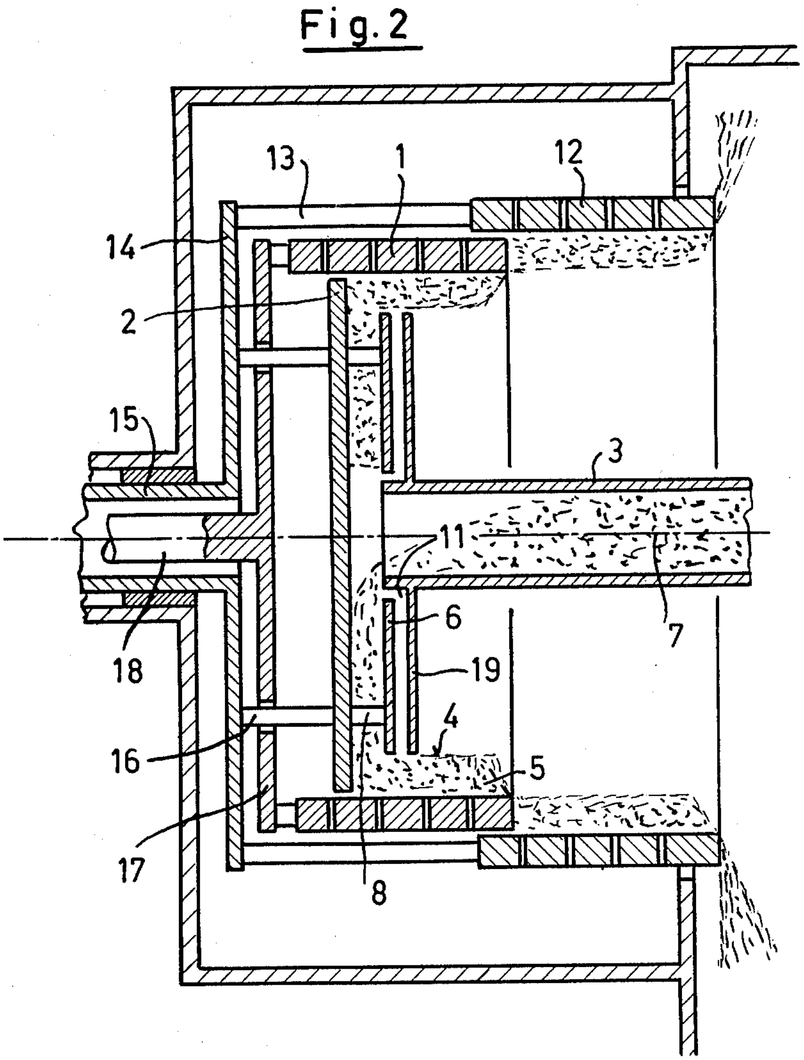

The pusher centrifuge shown in FIG. 2 differs from the embodiment in FIG. 1 only in the construction of the sealing device 11. Instead of the annular disc 9 fixed to the guiding wall 6, an annular disc 19 fixed to the inlet pipe 3 is provided. Thus, the friction pump formed by the two walls, i.e. the wall 6 and the annular disc 19, has one stationary and one rotating wall. In this way, the formation of bridges of solid particles between the two walls is safely prevented.

Figure 3:
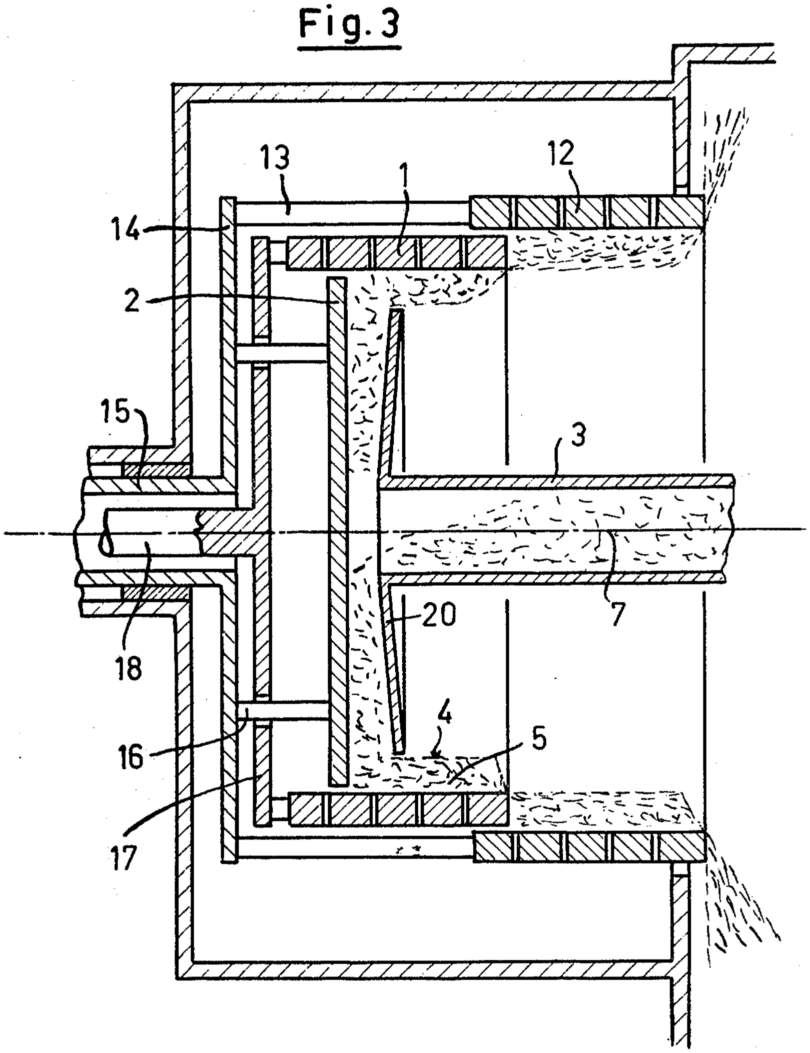

The pusher centrifuge shown in FIG. 3 differs from that shown in FIG. 1 only in the fact that, instead of the guiding wall 6 connected to the pusher plate 2, a guiding wall 20 fixed to the inlet pipe 3 is provided, thus making the sealing device 11 superfluous. The guiding wall 20 has has a surface facing towards the centrifuging mixture to be fed on which is facing away from the axis 7 of the centrifuge drum 1.

Similarly, the surface of the pusher plate 2 which faces the centrifuging mixure to be fed on could also be constructed so as to face away from the axis 7 of the centrifuge drum 1.

We claim:

1. In a pusher centrifuge having a perforated centrifuge drum, a pusher plate, an inlet pipe opening out coaxially with the centrifuge drum and a guiding wall for the centrifuging mixture to be fed onto the centrifuge drum, the said guiding wall extending from the inlet pipe to the inner surface of the layer of centrifuging mixture laying on the centrifuge drum, and between the pusher plate and the guiding wall there is a flow space, substantially free from components, for the centrifuging mixture; the improvement that the surfaces of the pusher plate and the guiding wall which bound said flow space face exclusively in directions other than toward the axis of the drum.

2. Pusher centrifuge according to claim 1, in which the guiding wall is fixed to the pusher plate and a separating gap is left between the guiding wall and the inlet pipe.

3. Pusher centrifuge according to claim 2, in which a sealing device is mounted in the region of the separating gap left between the guiding wall and the inlet pipe.

4. Pusher centrifuge according to claim 3, in which the sealing device comprises an annular disc extending parallel to and at a small spacing from the guiding wall.

5. Pusher centrifuge according to claim 4, in which the annular disc extends up to the inlet pipe leaving a separating gap and is fixed to the guiding wall.

6. Pusher centrifuge according to claim 4, in which the annular disc is fixed to the inlet pipe.

7. Pusher centrifuge according to claim 4, in which the annular disc extends to the inner surface of the layer of centrifuging mixture lying on the centrifuge drum.

8. Pusher centrifuge according to claim 1, in which the guiding wall is fixed to the inlet pipe.

* * * * *